United States Patent
Omran et al.

(10) Patent No.: US 10,823,287 B2
(45) Date of Patent: Nov. 3, 2020

(54) SYSTEM AND METHOD FOR DETERMINING AND CONTROLLING ENGINE SPEEDS DURING GEAR SHIFTING

(71) Applicant: CNH Industrial America LLC, New Holland, PA (US)

(72) Inventors: Ashraf Omran, Chicago, IL (US); Garth Harvey Bulgrien, Ephrata, PA (US); Brian A. Hartman, Valparaiso, IN (US)

(73) Assignee: CNH Industrial America LLC, New Holland, PA (US)

( * ) Notice: Subject to any disclaimer, the term of this patent is extended or adjusted under 35 U.S.C. 154(b) by 140 days.

(21) Appl. No.: 16/145,932

(22) Filed: Sep. 28, 2018

(65) Prior Publication Data

US 2020/0103025 A1 Apr. 2, 2020

(51) Int. Cl.
*F16H 63/50* (2006.01)
*F16H 61/02* (2006.01)
(Continued)

(52) U.S. Cl.
CPC ........... *F16H 63/502* (2013.01); *B60W 30/19* (2013.01); *F16H 61/0213* (2013.01); *B60W 10/06* (2013.01); *B60W 10/107* (2013.01); *B60W 10/108* (2013.01); *B60W 10/11* (2013.01); *B60W 2300/17* (2013.01); *B60W 2540/16* (2013.01); *B60W 2710/0644* (2013.01);
(Continued)

(58) Field of Classification Search
None
See application file for complete search history.

(56) References Cited

U.S. PATENT DOCUMENTS

| 4,593,580 A | 6/1986 | Schulze |
| 4,686,869 A | 8/1987 | Beim |

(Continued)

FOREIGN PATENT DOCUMENTS

| AU | 5939499 A | 6/2000 |
| GB | 2491885 B | 12/2017 |

OTHER PUBLICATIONS

Gear Ratio Engine RPM Calculator, 2018 (Webpage Only). http://www.businesspath.com/business_paths/auto/rpm-calc.html.
(Continued)

*Primary Examiner* — Justin Holmes
(74) *Attorney, Agent, or Firm* — Rickard K. DeMille; Rebecca L. Henkel

(57) ABSTRACT

A method for determining and controlling engine speeds of a work vehicle during gear shifts may include controlling an operation of an engine and/or a transmission of a work vehicle so as to maintain the work vehicle operating at a requested speed, and determining a measured gear ratio for the transmission as a gear shift is occurring from a first gear ratio to a second gear ratio. The method may also include calculating a desired engine speed during the gear shift as a function of the requested speed and either the measured gear ratio or the second gear ratio. In addition, when the measured gear ratio differs from the first gear ratio by a predetermined threshold amount, the method may include controlling the engine speed based on the desired engine speed for a remainder of the gear shift from the first gear ratio to the second gear ratio.

16 Claims, 6 Drawing Sheets

(51) Int. Cl.
  *B60W 30/19* (2012.01)
  *B60W 10/06* (2006.01)
  *B60W 10/108* (2012.01)
  *B60W 10/11* (2012.01)
  *F16H 59/08* (2006.01)
  *B60W 10/107* (2012.01)

(52) U.S. Cl.
  CPC ........ *F16H 59/08* (2013.01); *F16H 2059/082* (2013.01); *F16H 2306/54* (2013.01)

(56) References Cited

U.S. PATENT DOCUMENTS

| | | | |
|---|---|---|---|
| 5,235,876 | A | 8/1993 | Minowa et al. |
| 5,323,667 | A | 6/1994 | Tweed et al. |
| 5,569,115 | A | 10/1996 | Desautels et al. |
| 5,583,766 | A | 12/1996 | Birchenough et al. |
| 5,679,093 | A | 10/1997 | Desautels et al. |
| 6,589,136 | B2 | 7/2003 | Ephraim et al. |
| 7,048,671 | B2 | 5/2006 | Morisawa et al. |
| 7,048,672 | B2 | 5/2006 | Bothe et al. |
| 7,220,213 | B2 | 5/2007 | Shimada et al. |
| 8,016,723 | B2 | 9/2011 | Murayama et al. |
| 8,617,030 | B2 | 12/2013 | Kellum et al. |
| 8,657,045 | B2 | 2/2014 | Wang et al. |
| 8,900,095 | B2 | 12/2014 | Whitney et al. |
| 9,108,631 | B2 | 8/2015 | Wang et al. |
| 9,481,351 | B2 | 11/2016 | Kuang et al. |
| 2013/0166171 | A1 | 6/2013 | Hartman et al. |
| 2013/0296135 | A1* | 11/2013 | Kaminsky ........... F16H 61/0213 477/115 |
| 2015/0060173 | A1* | 3/2015 | Okubo .................. B60K 6/445 180/197 |
| 2018/0056975 | A1* | 3/2018 | Cho ....................... B60K 6/383 |

OTHER PUBLICATIONS

Fischer et al., Shift Dynamics and Shift Comfort, the Automotive Transmission Book, Springer, 2017, 11 pages.

* cited by examiner

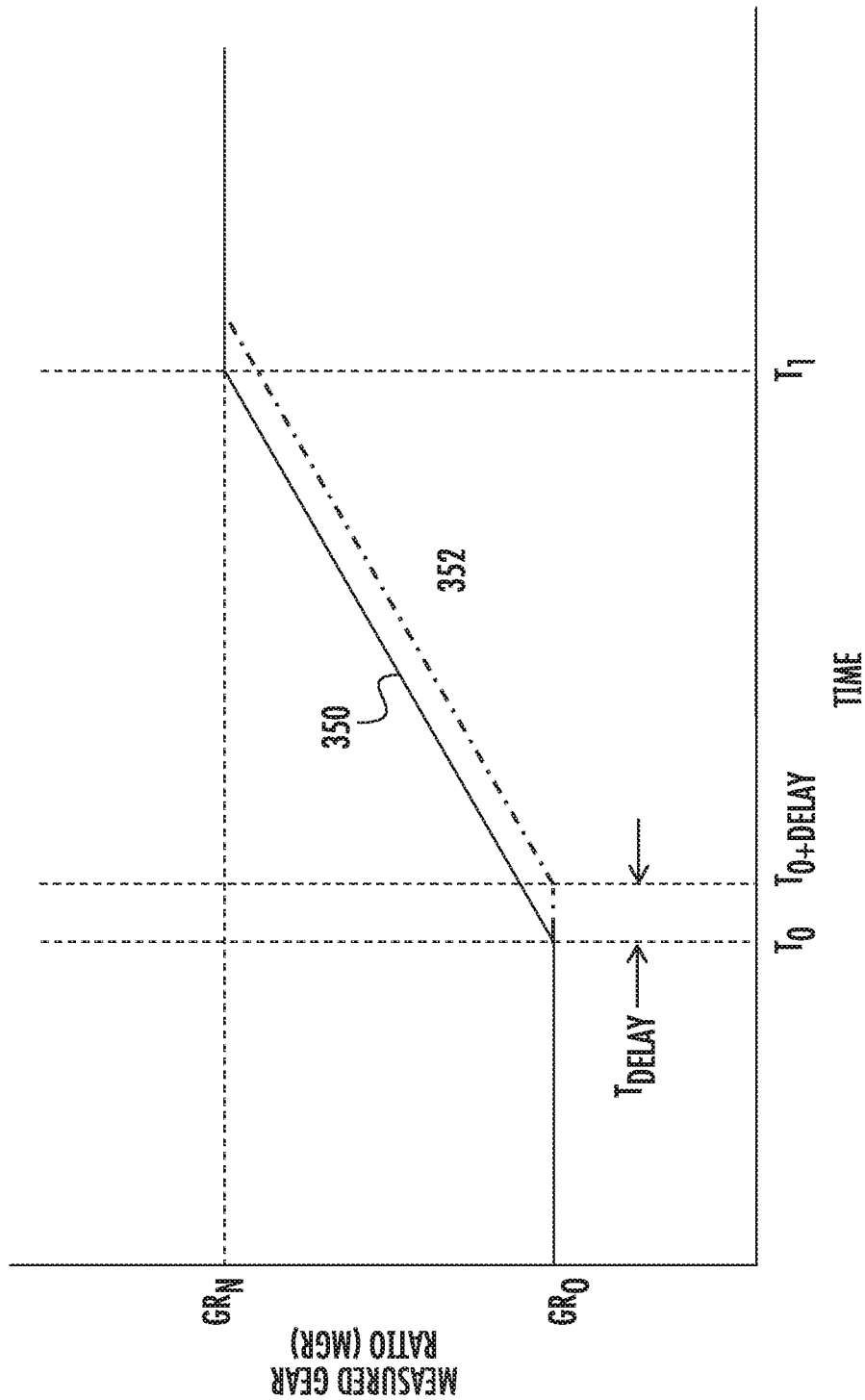

SYSTEM AND METHOD FOR DETERMINING AND CONTROLLING ENGINE SPEEDS DURING GEAR SHIFTING

FIELD OF THE INVENTION

The present subject matter relates generally to work vehicles and, more particularly, to a system and method for determining and controlling the engine speed of a work vehicle during gear shifting (e.g., while the vehicle is operating within an auto-efficiency or cruise control mode).

BACKGROUND OF THE INVENTION

Current work vehicles, such as tractors and other agricultural vehicles, include an electronically controlled engine and a transmission, such as a power shift transmission (PST) or a continuously variable transmission (CVT). In many instances, an operator may request that the engine and transmission of a work vehicle be automatically controlled via an associated vehicle controller to maintain the work vehicle at a given ground speed. In such instances, it is desirable to select the operational settings for the work vehicle in a manner that maximizes the vehicle's fuel efficiency.

For example, an engine speed may be selected for a given gear ratio of the transmission that provides the desired ground speed while minimizing fuel consumption. However, selection of an appropriate engine speed during shifting of the transmission can be quite challenging. In addition, if an appropriate engine speed is not selected during the shifting process, an undesirable oscillation can occur within the drivetrain that leads to more torque consumption than anticipated, thereby leading to increased fuel consumption.

Accordingly, a system and method for determining and controlling the engine speed of a work vehicle during gear shifting would be welcomed in the technology.

BRIEF DESCRIPTION OF THE INVENTION

Aspects and advantages of the invention will be set forth in part in the following description, or may be obvious from the description, or may he learned through practice of the invention.

In one aspect, the present subject matter is directed to a method for determining and controlling engine speeds of a work vehicle during gear shifts. The method may include controlling, with a computing device, an operation of at least one of an engine or a transmission of a work vehicle so as to maintain the work vehicle operating at a requested speed, and determining, with the computing device, a measured gear ratio for the transmission as a gear shift is occurring from a first gear ratio to a second gear ratio to maintain the work vehicle at the requested speed. The method may also include calculating, with the computing device, a desired engine speed for the engine during the gear shift as a function of the requested speed and one of the measured gear ratio or the second gear ratio. In addition, when the measured gear ratio differs from the first gear ratio by a predetermined threshold amount, the method may include controlling, with the computing device, an engine speed of the engine based on the desired engine speed for a remainder of the gear shift from the first gear ratio to the second gear ratio.

In another aspect, the present subject matter is directed to a method for determining and controlling engine speeds of a work vehicle during gear shifts. The method may include controlling, with a computing device, an operation of at least one of an engine or a transmission of a work vehicle so as to maintain the work vehicle operating at a requested speed, determining, with the computing device, a measured gear ratio for the transmission as a gear shift is occurring from a first gear ratio to a second gear ratio to maintain the work vehicle at the requested speed. In addition, the method may include calculating, with the computing device, a desired engine speed for the engine during the gear shift as a function of the requested speed and a time-lagged gear ratio for the transmission, wherein the time-lagged gear ratio at a given time during the gear shift corresponds to the measured gear ratio determined prior to the given time by a given delay period. The method may also include controlling, with the computing device, an engine speed of the engine based on the desired engine speed as the transmission is shifted from the first gear ratio to the second gear ratio.

In a further aspect, the present subject matter is directed to a system for determining and controlling engine speeds of a work vehicle during gear shifts. The system may include an engine, a transmission coupled to the engine, and a controller communicatively coupled to at least one of the engine or the transmission. The controller includes a processor and related memory. The memory may store instructions that, when implemented by the processor, configure the controller to control an operation of at least one of the engine or the transmission so as to maintain the work vehicle operating at a requested speed, and determine a measured gear ratio for the transmission as a gear shift is occurring from a first gear ratio to a second gear ratio to maintain the work vehicle at the requested speed. In addition, the controller may be configured to calculate a desired engine speed for the engine during the gear shift as a function of the requested speed and one of the measured gear ratio or the second gear ratio and, when the measured gear ratio differs from the first gear ratio by a predetermined threshold amount, control an engine speed of the engine based on the desired engine speed for a remainder of the gear shift from the first gear ratio to the second gear ratio.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 6 illustrates another exemplary plot of the measured gear ratio for a transmission over time during a gear shift in accordance with aspects of the present subject matter.

DETAILED DESCRIPTION OF THE INVENTION

Figure 1:
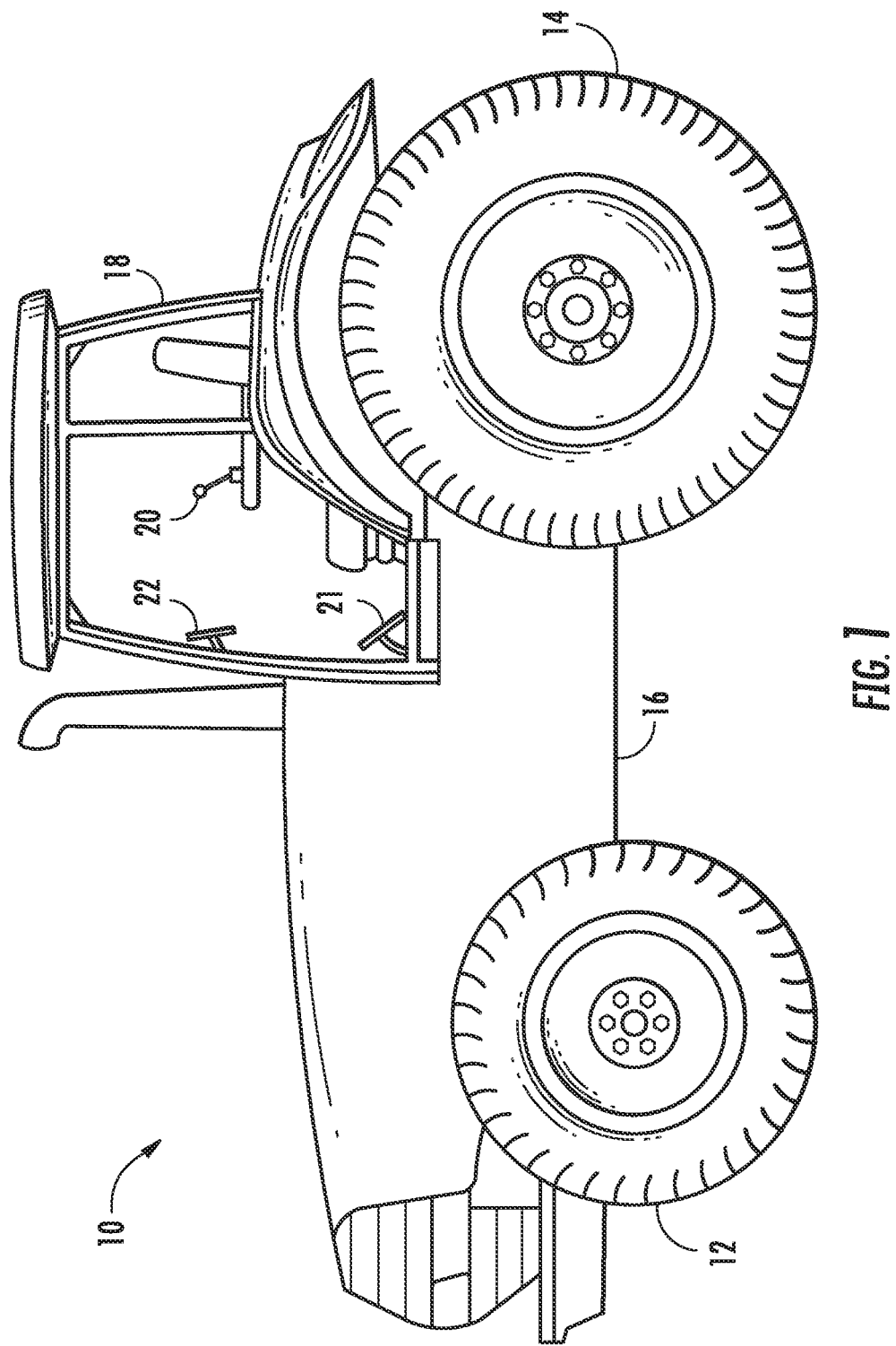
FIG. 1 illustrates a side view of one embodiment of a work vehicle in accordance with aspects of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to systems and methods for determining and controlling engine speeds of a work vehicle during the performance of a gear shift. Specifically, in several embodiments, upon the initiation of a gear shift to shift the transmission from an old gear ratio to a new gear ratio, a controller of the disclosed system may be configured to continuously calculate a measured gear ratio for the transmission. Additionally, in one embodiment, until the measured gear ratio differs from the old gear ratio by a threshold amount, the controller may be configured to determine a desired engine speed for the engine based on the old gear ratio. However, once it is determined that the measured gear ratio differs from the old gear ratio by at least the threshold amount, the controller may determine the desired engine speed based on a different gear ratio, such as the instantaneous measured gear ratio during the shift or the new gear ratio to be achieved. In another embodiment, the measured gear ratio may be used to determine a time-lagged gear ratio for the transmission. In such an embodiment, the time-lagged gear ratio may be used to determine the desired engine speed during the gear shift.

It should be appreciated that, in several embodiments of the present subject matter, the disclosed system and method may be implemented when the work vehicle is operating in an auto-efficiency or cruise control mode. For example, the operator may request that the work vehicle be maintained at a given ground speed. In such instance, the controller may be configured to control the operation of the vehicle's engine and/or transmission so as to maintain the work vehicle at the requested speed. In doing so, the controller may be configured to select a transmission gear and associated engine speed so as to achieve the operator-selected speed while minimizing fuel consumption. In this regard, while operating within the auto-efficiency mode before and after a gear shift, the controller may be configured to select the desired engine speed based on the ratio of the operator-requested speed and either the old gear ratio (before the transmission shift) or new gear ratio (after the transmission shift). Additionally, as will be described below, during the occurrence of the gear shift, the controller may be configured to select the desired engine speed in accordance with the disclosure provided herein.

Referring now to the drawings, FIG. 1 illustrates a side view of one embodiment of a work vehicle 10. As shown, the work vehicle 10 is configured as an agricultural tractor. However, in other embodiments, the work vehicle 10 may be configured as any other suitable work vehicle known in the art, such as various other agricultural vehicles, earth-moving vehicles, loaders and/or various other off-road vehicles.

As shown in FIG. 1, the work vehicle 10 includes a pair of front wheels 12, a pair or rear wheels 14 and a chassis 16 coupled to and supported by the wheels 12, 14. An operator's cab 18 may be supported by a portion of the chassis 16 and may house various control or input devices 20, 21, 22 (e.g., levers, pedals, control panels, buttons and/or the like) for permitting an operator to control the operation of the work vehicle 10. For instance, as shown in FIG. 1, the work vehicle 10 may include an input lever 20 for controlling the engine speed of the vehicle 10 and a clutch pedal 21. In addition, the work vehicle 10 may include a control panel 22 for displaying message windows and/or alerts to the operator and/or for allowing the operator to interface with the vehicle's controller. For instance, in one embodiment, the control panel 22 may include buttons, knobs and/or any other suitable input devices that allow the operator to provide user inputs to the controller, such as by allowing the operator to provide an input instructing the controller to operate the work vehicle 10 in an auto-efficiency mode or cruise control mode so as to maintain the vehicle 10 at a desired ground speed.

It should be appreciated that the configuration of the work vehicle 10 described above and shown in FIG. 1 is provided only to place the present subject matter in an exemplary field of use. Thus, it should be appreciated that the present subject matter may be readily adaptable to any manner of work vehicle configuration. For example, in an alternative embodiment, the work vehicle may include an articulated chassis to steer the work vehicle 10, or rely on tracks in lieu of the wheels 12, 14. Additionally, the work vehicle 10 may also be configured to be operably coupled to any suitable type of work implement.

Figure 2:
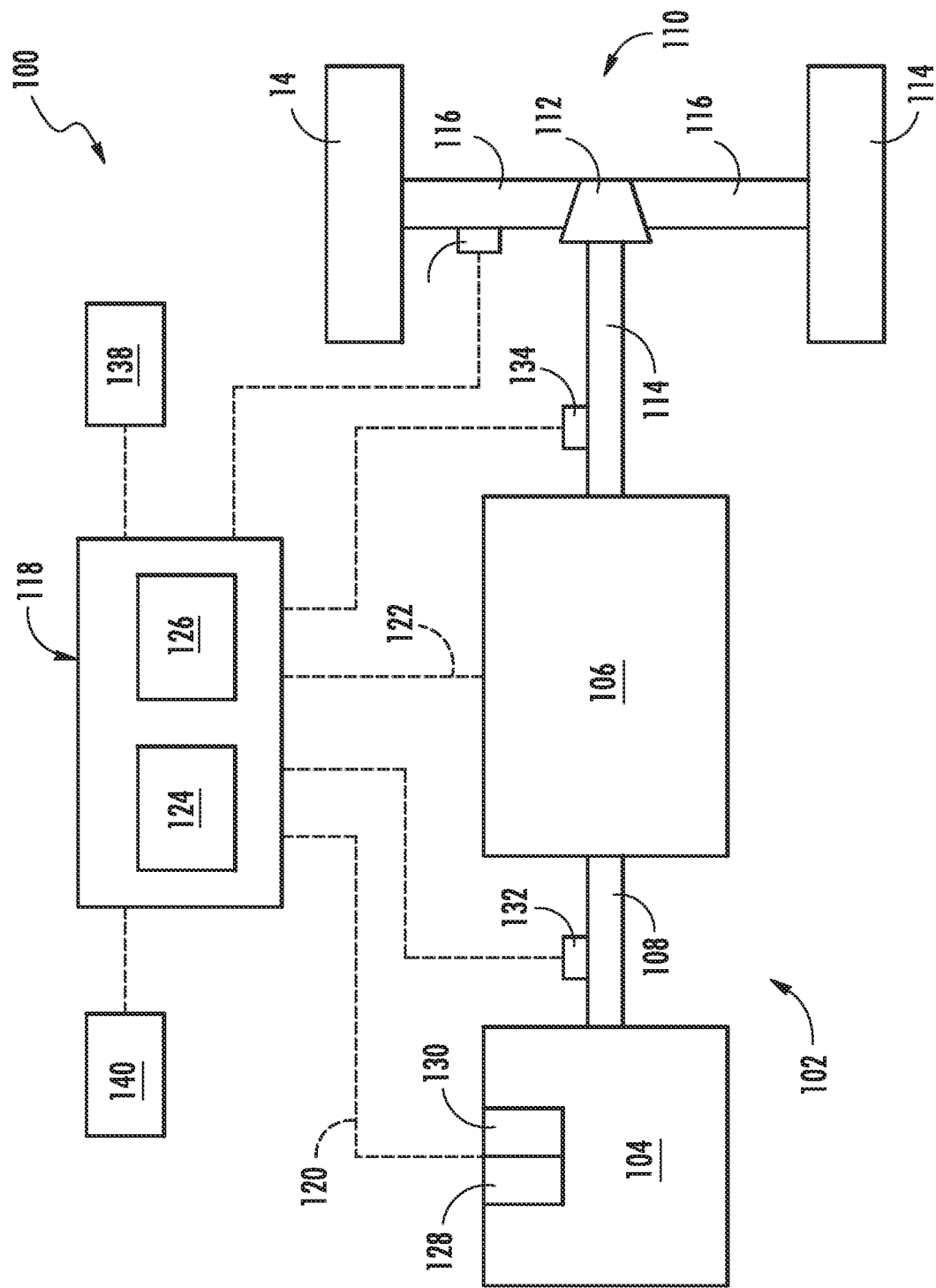
FIG. 2 illustrates a schematic view of one embodiment of a system for determining and controlling engine speeds of a work vehicle during gear shifting in accordance with aspects of the present subject matter.

Referring now to FIG. 2, a schematic diagram of one embodiment of a system 100 for determining and controlling the engine speed of a work vehicle during gear shifting is illustrated in accordance with aspects of the present subject matter. For purposes of discussion, the system 100 will be described herein with reference to the work vehicle 10 shown and described above with reference to FIG. 1. However, it should be appreciated that, in general, the disclosed system 100 may be utilized to control the operation of any work vehicle having any suitable vehicle configuration.

As shown, the system 100 may generally include a drivetrain 102 suitable for transferring power to the drive wheels of the work vehicle 10 (e.g., the rear wheels 14). In general, the drivetrain 102 may include an engine 104 and a transmission 106 configured to be mounted on the chassis 16 (FIG. 1) of the work vehicle 10. The transmission 106 may be operably coupled to the engine 104 via one or more shafts 108 and may be configured to provide variably adjusted gear ratios for transferring engine power to the drive wheels 14 via a drive axle assembly 110. As shown, the drive axle assembly 110 may include a differential 112 coupled to an output shaft 114 of the transmission 106 and one or more axle shafts 116 coupled to the differential 112 for transferring power to the drive wheels 14.

As shown in FIG. 2, the system 100 may also include a controller 118 configured to control the operation of one or more components of the work vehicle 10, such as the engine 104 and the transmission 106. For example, the controller 118 may be communicatively coupled to one or more components of the engine 104 (e.g., an engine governor or engine control unit (ECU) (not shown)) via one or more communicative links 120 in order to control and/or monitor the speed and/or torque output of the engine 104. Specifically, the controller 118 may be configured to send a commanded engine speed to the ECU requesting that the ECU adjust the actual engine speed to match the commanded engine speed. The ECU may then adjust the actual engine speed as requested. Similarly, the controller 118 may be communicatively coupled to one or more transmission components via one or more communicative links 122 to control the operation of the transmission 106. For instance, the controller 118 may be configured to transmit suitable current commands via communicative link 122 to one or more clutch valves (not shown) to control the engagement and disengagement of one or more clutches (not shown) of the transmission 106. As such, the controller 118 may be configured to cause the transmission 106 to be upshifted or downshifted, as desired, to adjust the current gear ratio of the transmission 106.

It should be appreciated that the controller 118 may generally comprise any suitable processor-based device known in the art, such as one or more computing devices. Thus, in several embodiments, the controller 118 may include one or more processor(s) 124 and associated memory 126 device(s) configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory 126 of the controller 118 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory 126 may generally be configured to store suitable computer-readable instructions that, when implemented by the processor(s) 124, configure the controller 118 to perform various computer-implemented functions, such as the methods 200, 300 described below with reference to FIGS. 3 and 5. In addition, the memory 126 of the controller 118 may also include various types of relevant data for performing the control functions described herein, such as by including all of the gear ratios of the transmission 106 stored therein. Moreover, the controller 118 may also include various other suitable components, such as a communications circuit or module, one or more input/output channels, a data/control bus and/or the like.

It should also be appreciated that the controller 118 may correspond to an existing controller of the work vehicle 10 (e.g., an existing engine and/or transmission controller) or the controller 118 may correspond to a separate controller. For instance, in one embodiment, the controller 118 may form all or part of a separate plug-in module that may be installed within the work vehicle 10 to allow for the disclosed system and method to be implemented without requiring additional software to be uploaded onto existing control devices of the vehicle 10.

The system 100 may also include one or more sensors for monitoring various operating parameters of the work vehicle 10. For example, as shown in FIG. 2, the controller 118 may be communicatively coupled to various sensors, such as a torque sensor 128 and/or a speed sensor 130, mounted on and/or within the engine 104 for monitoring the engine torque loads and/or the engine speed. In one embodiment, the sensors) 128, 130 may comprise an internal sensor(s) of an engine governor (not shown) of the engine 104. In another embodiment, the system 100 may include any other suitable sensor(s) configured to monitor the torque loads and/or the speed of the engine 104. For instance, a first speed sensor 132 may be provided in association with the output shaft 108 of the engine 104 for monitoring the current engine speed (e.g., in RPMs), which may also correspond to the transmission input speed.

Moreover, the system 100 may also include one or more sensors (e.g., shaft encoders, shaft sensors and/or any other suitable sensors) configured to monitor one or more additional rotational speeds of the drivetrain 102 and/or the ground speed of the work vehicle 10. For example, as shown in FIG. 2, the system 100 may include a second speed sensor 134 provided in operative association with the transmission 106 and/or the output shaft 114 for monitoring the transmission output speed. In addition, the system 100 may optionally include an additional speed sensor 136 provided in operative association with the drive axle assembly 110 for monitoring the axle speed of the drive axles 116 (and, thus, the rotational speed of the drive wheels 14). Further, the system 100 may also include a ground speed sensor 138 for monitoring the current ground speed of the work vehicle 10. In one embodiment, the ground speed sensor 138 may correspond to a GPS device or any other suitable sensing device configured to provide an indication of the ground speed of the work vehicle 10.

By receiving the measurement signals from the speed sensors 130/132, and 134, the controller 118 may be capable of determining a measured gear ratio through the transmission 106. Specifically, in several embodiments, the measured gear ratio through the transmission 106 may be determined using the following equation (Equation 1):

$$MGR = \left(\frac{TOS}{TIS}\right) \qquad (1)$$

wherein, MGR corresponds to the measured gear ratio through the transmission 106, TOS corresponds to the output speed of the transmission 106 (e.g., as measured via sensor 134) and TIS corresponds to the input speed of the transmission 106 (e.g., as measured via sensor 130 and/or sensor 132).

It should be appreciated that the measured gear ratio may continuously change while a transmission ratio change or gear shift is occurring. The controller 118 may continuously (e.g., every 10 milliseconds) calculate the measured gear ratio through the transmission 106 during the period of the occurrence of a transmission ratio change or gear shift (e.g., during a period of 1-3 seconds).

As shown in FIG. 2, the system 100 may also include one or more input devices 140 communicatively coupled to the controller 118 to allow operator inputs to be provided to the system 100. For example, as indicated above, the work vehicle 10 may include a suitable input device 140 (e.g., a button, switch or other suitable input device positioned on the control panel 22 shown in FIG. 1) configured to permit an operator to input a ground speed command corresponding to a desired ground speed for the vehicle 10, such as when the work vehicle 10 is being operated in an auto-efficiency mode or cruise control mode. In such an embodiment, upon receipt of the ground speed command, the controller 118 may be configured to control the operation of the engine 104 and/or the transmission 106 in order to achieve the requested ground speed. For example, the controller 118 may determine a desired engine speed and transmission ratio or gear for operating the vehicle in order to achieve the operator-requested speed while maximizing fuel efficiency. In doing so, based on the desired gear and/or as the loading on the vehicle changes, the controller 118 may determine that a gear shift is necessary or desired to maintain the requested speed and desired fuel efficiency. In such instance, the controller 118 may be configured to determine a desired engine speed for operating the engine during the gear shift and may subsequently control the operation of the engine to achieve the desired engine speed as the gear shift is occurring. For example, as will be described below, in several embodiments, the controller 118 may be configured to calculate the desired engine speed during the gear shift based on the instantaneous measured gear ratio (MGR) or the new gear ratio to be achieved following the gear shift. In another embodiment, the controller 118 may be configured to calculate the desired engine speed during the gear shift based on a time-lagged gear ratio determined as a function of the measured gear ratio (MGR).

Figure 3:
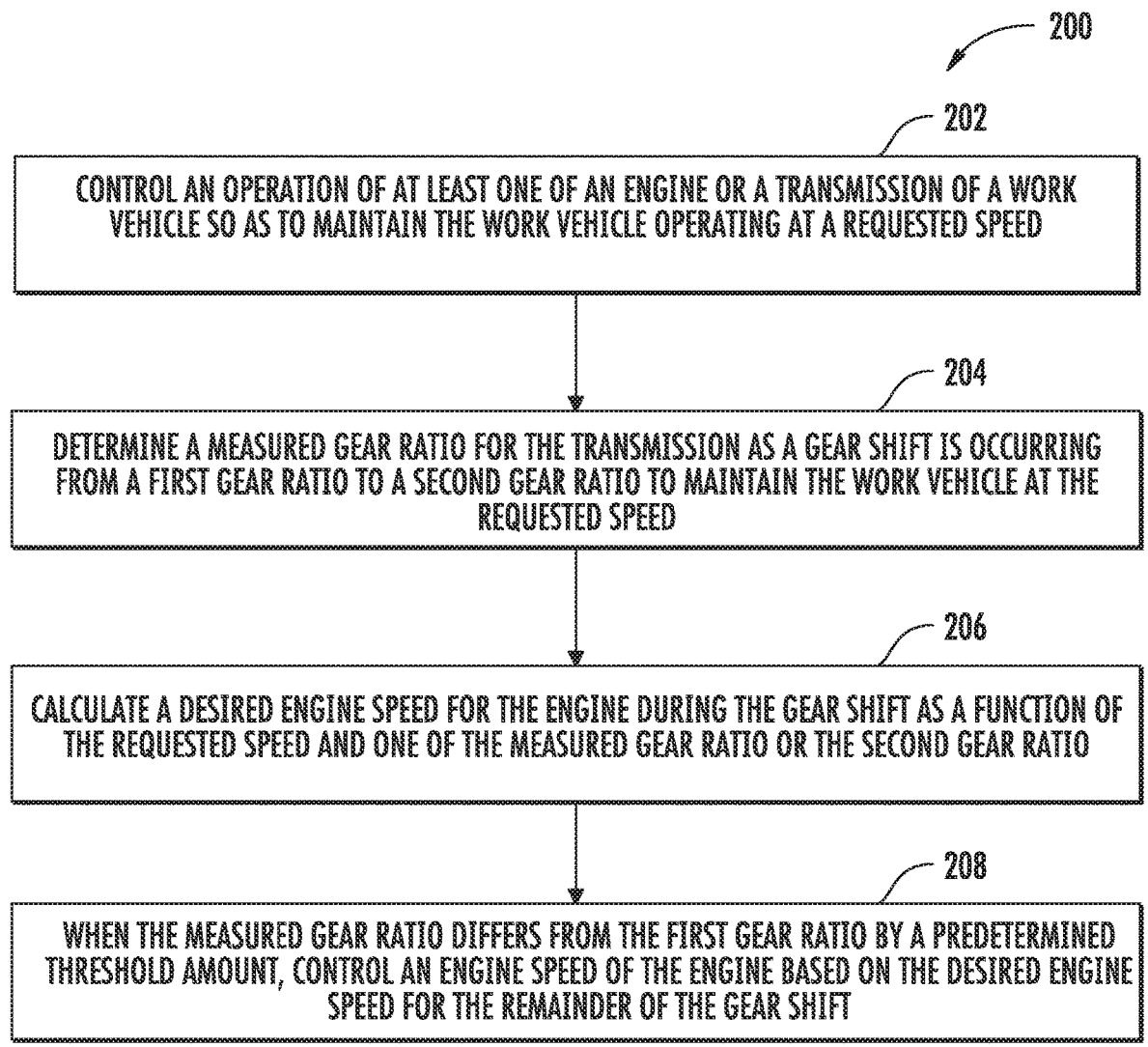
FIG. 3 illustrates a flow diagram of one embodiment of a method for determining and controlling engine speeds of a work vehicle during gear shifting in accordance with aspects of the present subject matter.

Referring now to FIG. 3, a flow diagram of one embodiment of a method 200 for determining and controlling the engine speed of a work vehicle during gear shifting is illustrated in accordance with aspects of the present subject matter. In general, the method 200 will be described herein with reference to the system 100 described above with reference to FIG. 2. However, it should be appreciated by those of ordinary skill in the art that the disclosed method 200 may be implemented within any other system having any other suitable system configuration. In addition, although FIG. 3 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 3, at (202), the method 200 includes controlling an operation of at least one of an engine or a transmission of a work vehicle so as to maintain the work vehicle operating at a requested speed. As indicated above, upon receipt of an input(s) from the operator, the system controller 118 may be configured control the operation of the engine 104 and/or transmission 106 so as to maintain an operator-requested speed, such as a requested axle speed and/or a requested ground speed. For instance, in one embodiment, the controller 118 may be configured to execute an auto-efficiency mode or cruise control mode in which the operator selects a desired ground speed for the work vehicle 10. The controller 118 may then determine the appropriate gear ratio for the transmission 106 and associated engine speed that will allow the vehicle 10 to be driven at the operator-selected ground speed while minimizing fuel consumption. In this regard, when the selected gear ratio differs from the current gear ratio or when a gear shift is necessary due to changing load conditions, the controller 118 is configured to determine a desired engine speed for the engine in accordance with aspects of the present subject matter as the transmission is being shifted.

Additionally, at (204), when it is determined that a gear shift from a first or old gear ratio to a second or new gear ratio is necessary or desired to maintain the work vehicle at the requested speed, the method 200 includes determining a measured gear ratio for the transmission as the gear shift is occurring. As indicated above, the controller 118 may be configured to calculate the measured gear ratio (MGR) using Equation 1. For example, the controller 118 may continuously monitor the speed measurements provided by the speed sensors 130, 132, 134 to determine instantaneous speed values for both the transmission input speed and output speed. Such instantaneous speed values may then be used to calculate a corresponding instantaneous measured gear ratio for the transmission 106 during the gear shift. In this regard, as indicated above, it should be appreciated that the measured gear ratio will continuously change as the gear shift from the old gear ratio to the new gear ratio is being executed.

Figure 4:
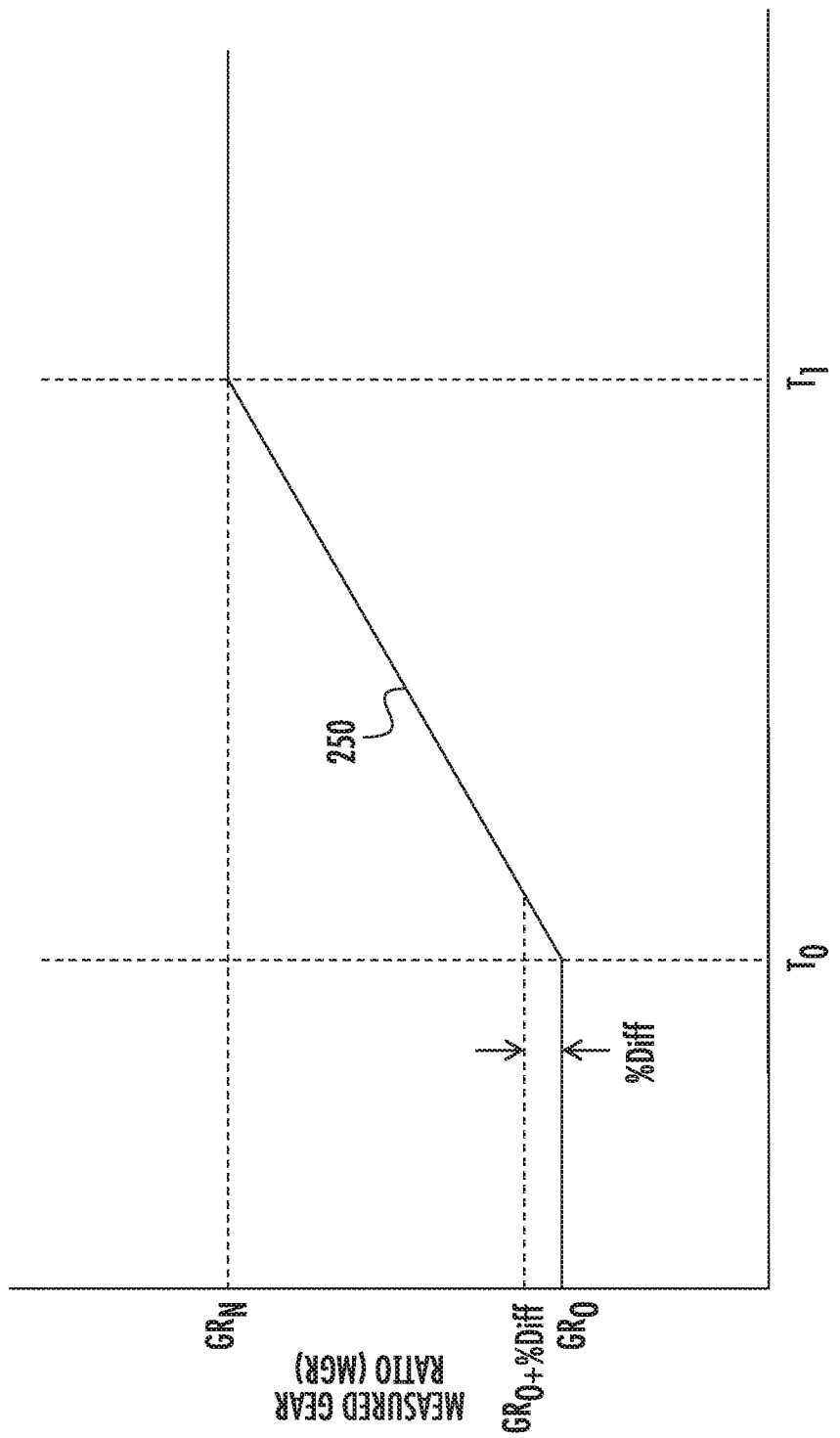
FIG. 4 illustrates an exemplary plot of the measured gear ratio for a transmission over time during a gear shift in accordance with aspects of the present subject matter.

For instance, FIG. 4 illustrates an example plot of the measured gear ratio (MGR) for a transmission as a gear shift is occurring (e.g., from time ($t_0$) to time ($t_1$)) from a first or old gear ratio ($GR_O$) to a second or new gear ratio ($GR_N$). For purposes of illustration, the measured gear ratio is shown as changing linearly over time from the old gear ratio to the new gear ratio as the gear shift is occurring (e.g., as indicated by line 250). However, it should be appreciated that the measured gear ratio may change non-linearly with time as the gear shift is occurring. As shown, from the initiation of the gear shift (e.g., at time ($t_0$)), the measured gear ratio may generally vary continuously between the old gear ratio ($GR_O$) and the new gear ratio ($GR_N$) to the completion of the gear shift (e.g., at time ($t_1$)).

Referring back to FIG. 3, at (206), the method 200 includes calculating a desired engine speed for the engine during the gear shift as a function of the requested speed and one of the measured gear ratio or the second gear ratio. Specifically, in one embodiment, the controller 118 may be configured to calculate the desired engine speed as a function of the requested speed and the instantaneous measured gear ratio during the gear shift. For example, the controller 118 may calculate the desired engine speed according to the following equation (Equation 2):

$$ES = \frac{RS}{MGR} \quad (2)$$

wherein, ES corresponds to the desired engine speed, RS corresponds to the requested speed (e.g., the axle or wheel speed associated with the operator-selected ground speed), and MGR corresponds to the measured gear ratio.

By utilizing the measured gear ratio, the desired engine speed calculated using Equation 2 will continuously change during the gear shift. Specifically, the measured gear ratio may be continuously updated based on the instantaneous speed values received from the speed sensors 132, 134 to allow a new value for the desired engine speed to be calculated during the gear shift.

In an alternative embodiment, the controller 118 may be configured to calculate the desired engine speed as a function of the requested speed and the new gear ratio to be achieved following the gear shift. In such an embodiment, the desired engine speed may remain constant during the gear shift. For example, the controller 118 may calculate the desired engine speed according to the following equation (Equation 3):

$$ES = \frac{RS}{GR_N} \quad (3)$$

wherein, ES corresponds to the desired engine speed, RS corresponds to the requested speed (e.g., the axle or wheel speed associated with the operator-selected ground speed), and $GR_N$ corresponds to the new gear ratio.

Referring still to FIG. 3, at (208), when the measured gear ratio differs from the first or old gear ratio by a predetermined threshold amount, the method 200 includes controlling an engine speed of the engine based on the desired engine speed for the remainder of the gear shift. Specifically, in one embodiment, upon initiation of the gear shift, the controller 118 may be configured to continue to transmit commands to the ECU indicating that the operation of the engine 104 be based on a desired engine speed calculated as a function of the old gear ratio until the controller 118 determines that the measured gear ratio has varied from the old gear ratio by a predetermined threshold amount. Thereafter, the controller 118 may be configured to transmit a commanded engine speed to the ECU corresponding to the desired engine speed determined as a function of the measured gear ratio or the new gear ratio (e.g., as determined based on Equation 2 or Equation 3 described above). The ECU may then control the operation of the engine to adjust the actual engine speed, as necessary, to the commanded/desired engine speed.

It should be appreciated that, in several embodiments, the predetermined threshold amount may correspond to a percent difference between the measured gear ratio and the old gear ratio. For example, as shown in FIG. 4, upon initiation of the gear shift, the controller 118 may be configured to determine when the measured gear ratio (MGR) has changed from the old gear ratio ($GR_O$) by a given percent difference (% Diff). Once it is determined that the measured gear ratio has changed by the threshold amount (e.g., from the old gear ratio ($GR_O$) to a new measured gear ratio ($GR_{O+\%Diff}$)), the controller may transmit a commanded engine speed to the ECU corresponding to the desired engine speed determined as a function of the measured gear ratio or the new gear ratio (e.g., as determined based on Equation 2 or Equation 3 described above).

In one embodiment, the percent difference threshold may correspond to a percent difference between the measured gear ratio and the old gear ratio ranging from greater than zero to less than 5%, such as greater than 1% to less than 3%, or from greater than 1.5% to less than 2.5% and/or any other subranges therebetween.

Figure 5:
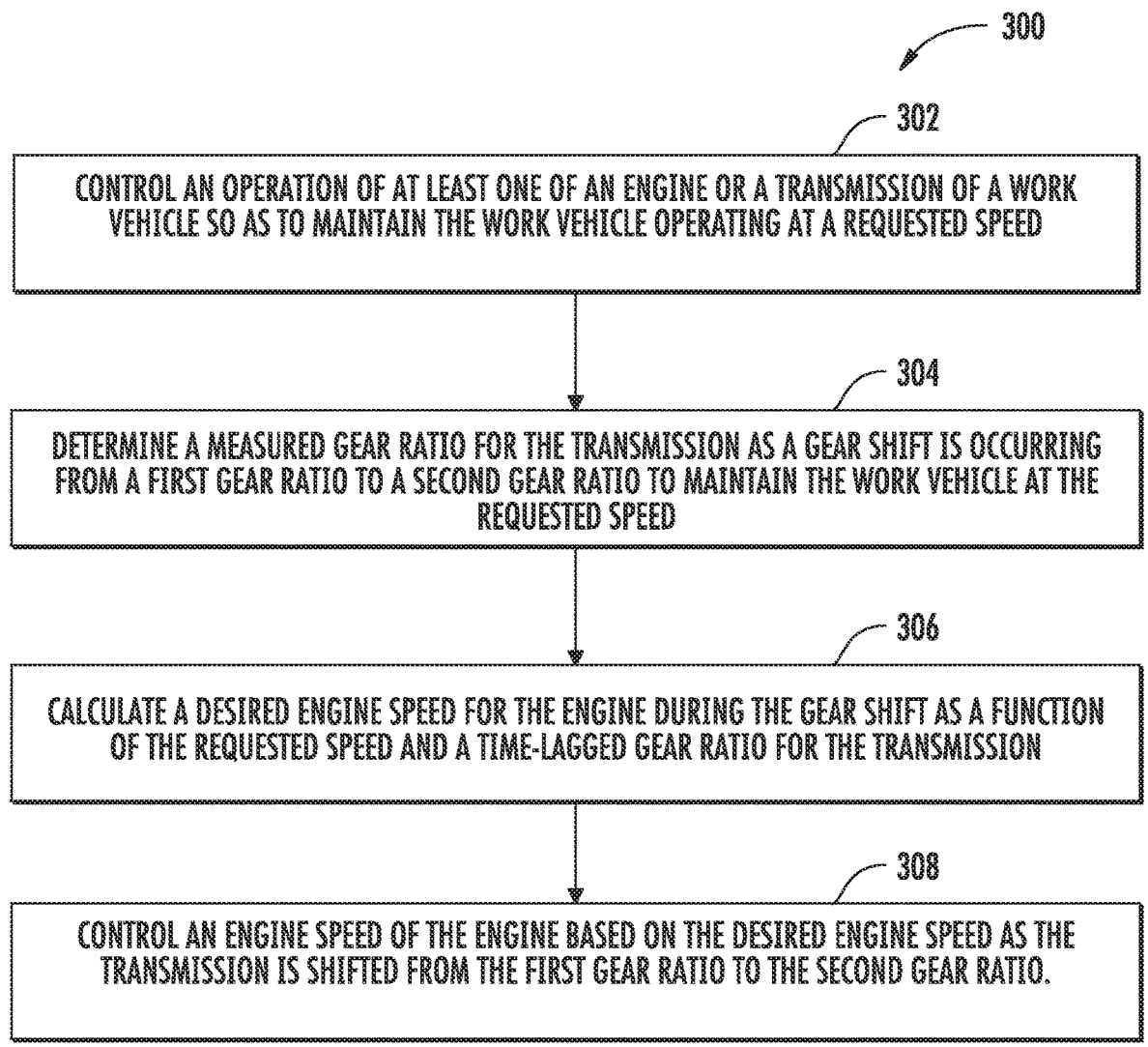
FIG. 5 illustrates a flow diagram of another embodiment of a method for determining and controlling engine speeds of a work vehicle during gear shifting in accordance with aspects of the present subject matter.

Referring now to FIG. 5, a flow diagram of another embodiment of a method 300 for determining and controlling the engine speed of a work vehicle during gear shifting is illustrated in accordance with aspects of the present subject matter. In general, the method 300 will be described herein with reference to the system 100 described above with reference to FIG. 2. However, it should be appreciated by those of ordinary skill in the art that the disclosed method 300 may be implemented within any other system having any other suitable system configuration. In addition, although FIG. 5 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 5, at (302), the method 300 includes controlling an operation of at least one of an engine or a transmission of a work vehicle so as to maintain the work vehicle operating at a requested speed. As indicated above, upon receipt of an input(s) from the operator, the system controller 118 may be configured control the operation of the engine 104 and/or transmission 106 so as to maintain an operator-requested speed, such as a requested axle speed and/or a requested ground speed. For instance, in one embodiment, the controller 118 may be configured to execute an auto-efficiency mode or cruise control mode in which the operator selects a desired ground speed for the work vehicle 10. The controller 118 may then determine the appropriate gear ratio for the transmission 106 and associated engine speed that will allow the vehicle 10 to be driven at the operator-selected ground speed while minimizing fuel consumption. In this regard, when the selected gear ratio differs from the current gear ratio or when a gear shift is necessary due to changing load conditions, the controller 118 is configured to determine a desired engine speed for the engine in accordance with aspects of the present subject matter as the transmission is being shifted.

Additionally, at (304), when it is determined that a gear shift from a first or old gear ratio to a second or new gear ratio is necessary or desired to maintain the work vehicle at the requested speed, the method 300 includes determining a measured gear ratio for the transmission as the gear shift is occurring. As indicated above, the controller 118 may be configured to calculate the measured gear ratio (MGR) using Equation 1. For example, the controller 118 may continuously monitor the speed measurements provided by the speed sensors 130, 132, 134 to determine instantaneous speed values for both the transmission input speed and output speed. Such instantaneous speed values may then be used to calculate a corresponding instantaneous measured gear ratio for the transmission 106 during the gear shift. In this regard, as indicated above, it should be appreciated that the measured gear ratio will continuously change as the gear shift from the old gear ratio to the new gear ratio is being executed.

For example, FIG. 6 illustrates an example plot of the measured gear ratio (MGR) for a transmission as a gear shift is occurring (e.g., from time ($t_0$) to time ($t_1$)) from a first or old gear ratio ($GR_O$) to a second or new gear ratio ($GR_N$). For purposes of illustration, the measured gear ratio is shown as changing linearly over time from the old gear ratio to the new gear ratio during the gear shift (e.g., as indicated by line 350). However, it should be appreciated that the measured gear ratio may change non-linearly with time as the gear shift is occurring. As shown, from the initiation of the gear shift (e.g., at time ($t_0$)), the measured gear ratio may generally vary continuously between the old gear ratio ($GR_O$) and the new gear ratio ($GR_N$) to the completion of the gear shift (e.g., at time ($t_1$)).

Referring back to FIG. 5, at (306), the method 300 includes calculating a desired engine speed for the engine during the gear shift as a function of the requested speed and a time-lagged gear ratio for the transmission. Specifically, in one embodiment, the controller 118 may be configured to calculate the desired engine speed according to the following equation (Equation 4):

$$ES = \frac{RS}{GR_{t-t_{delay}}} \qquad (4)$$

Wherein, ES corresponds to the desired engine speed, RS corresponds to the requested speed (e.g., the axle or wheel speed associated with the operator-selected ground speed), and $GR_{t-t_{delay}}$ corresponds to the time-lagged gear ratio.

In one embodiment, the time-lagged gear ratio used to determine the desired engine speed may correspond to the measured gear ratio calculated by the controller 118 with a time delay applied. Specifically, the instantaneous or current time-lagged gear ratio during the gear shift may correspond to the measured gear ratio calculated by the controller at a previous time equal to the current time (t) less a predetermined delay period (e.g., at time $(t-t_{Delay})$). Stated differently, as the controller calculates the instantaneous measured gear ratio at each instance during the gear shift, the determined value may be time stamped and stored within the controller's memory. Such determined value may then be subsequently used at a later time (e.g., the previous instance in time at which the gear ratio was calculated plus the predetermined delay period $(t+t_{Delay})$) as the time-lagged gear ratio to calculate the desired engine speed at such later time. For instance, as shown in FIG. 6, the line 350 representing the instantaneous measured gear ratio calculated by the controller 118 may be shifted over by an amount equal to the time delay $(t_{Delay})$ to create a time-lagged gear ratio curve (indicated by line 352). In such instance, the controller 118 may utilize the measured gear ratio defined along the time-lagged gear ratio curve 352 as the time-lagged gear ratio for calculating the desired engine speed at each instance during the gear shift.

In one embodiment, the time delay may correspond to a delay period ranging from 0.01 seconds to 0.1 seconds, such as from 0.03 seconds to 0.07 seconds or from 0.04 seconds to 0.06 seconds and/or any other subranges therebetween.

Referring back to FIG. 5, at (308), the method 300 includes controlling an engine speed of the engine based on the desired engine speed as the transmission is shifted from the gear ratio to the second gear ratio. Specifically, upon initiation of the gear shift, the controller 118 may be configured to transmit a commanded engine speed to the ECU that corresponds to the desired engine speed determined as a function of the requested speed and the time-lagged gear ratio (e.g., as determined based on Equation 4 described above). In such instance, as shown in FIG. 6, the time-lagged gear ratio may, for example, be equal to the old gear ratio ($GR_O$) for a period of time following initiation of the gear shift (e.g., at time ($t_0$)) equal to the delay period ($t_{Delay}$) prior to continuously changing over the remainder of the gear shift along the time-lagged gear ratio curve 352. The ECU may then control the operation of the engine to adjust the actual engine speed, as necessary, to the commanded/desired engine speed.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for determining and controlling engine speeds of a work vehicle during gear shifts, the method comprising:

controlling, with a computing device, an operation of at least one of an engine or a transmission of a work vehicle so as to maintain the work vehicle operating at a requested speed;

determining, with the computing device, a measured gear ratio for the transmission as a gear shift is occurring from a first gear ratio to a second gear ratio to maintain the work vehicle at the requested speed, wherein the measured gear ratio is determined as a function of an instantaneous input speed of the transmission and of an instantaneous output speed of the transmission as the gear shift is occurring;

calculating, with the computing device, a desired engine speed for the engine during the gear shift as a function of the requested speed and one of the measured gear ratio or the second gear ratio; and when the measured gear ratio differs from the first gear ratio by a predetermined threshold amount, controlling, with the computing device, an engine speed of the engine based on the desired engine speed for a remainder of the gear shift from the first gear ratio to the second gear ratio.

2. The method of claim 1, wherein calculating the desired engine speed for the engine during the gear shift comprises calculating the desired engine speed as a function of the requested speed and the measured gear ratio.

3. The method of claim 1, wherein calculating the desired engine speed for the engine during the gear shift comprises calculating the desired engine speed as a function of the requested speed and the second gear ratio.

4. The method of claim 1, wherein controlling the engine speed of the engine based on the desired engine speed comprises commanding that the engine be operated at an engine speed corresponding to the desired engine speed once a percent difference between the measured gear ratio and the first gear ratio exceeds a value that is greater than zero and less than 5%.

5. The method of claim 4, wherein commanding that the engine be operated at an engine speed corresponding to the desired engine speed comprises commanding that the engine be operated at an engine speed corresponding to the desired engine speed once the percent difference between the measured gear ratio and the first gear ratio exceeds a value that is greater than 1% and less than 3%.

6. The method of claim 1, further comprising receiving an input from the operator associated with maintaining the work vehicle at the requested speed.

7. A method for determining and controlling engine speeds of a work vehicle during gear shifts, the method comprising:

controlling, with a computing device, an operation of at least one of an engine or a transmission of a work vehicle so as to maintain the work vehicle operating at a requested speed;

determining, with the computing device, a measured gear ratio for the transmission as a gear shift is occurring from a first gear ratio to a second gear ratio to maintain the work vehicle at the requested speed wherein the measured gear ratio is determined as a function of an instantaneous input speed of the transmission and of an instantaneous output speed of the transmission as the gear shift is occurring;

calculating, with the computing device, a desired engine speed for the engine during the gear shift as a function of the requested speed and a time-lagged gear ratio for the transmission, the time-lagged gear ratio at a given time during the gear shift corresponding to the measured gear ratio determined prior to the given time by a given delay period; and controlling, with the computing device, an engine speed of the engine based on the desired engine speed as the transmission is shifted from the first gear ratio to the second gear ratio.

8. The method of claim 7, wherein the time delay ranges from 0.01 seconds to 0.1 seconds.

9. The method of claim 8, wherein the time delay ranges from 0.03 seconds to 0.07 seconds.

10. The method of claim 7, further comprising receiving an input from the operator associated with maintaining the work vehicle at the requested speed.

11. A system for determining and controlling engine speeds of a work vehicle during gear shifts, the system comprising:
an engine;
a transmission coupled to the engine;
a controller communicatively coupled to at least one of the engine or the transmission, the controller including a processor and related memory, the memory storing instructions that, when implemented by the processor, configure the controller to:
control an operation of at least one of the engine or the transmission so as to maintain the work vehicle operating at a requested speed;
determine a measured gear ratio for the transmission as a gear shift is occurring from a first gear ratio to a second gear ratio to maintain the work vehicle at the requested speed, wherein the measured gear ratio is determined as a function of an instantaneous input speed of the transmission and of an instantaneous output speed of the transmission as the gear shift is occurring;
calculate a desired engine speed for the engine during the gear shift as a function of the requested speed and one of the measured gear ratio or the second gear ratio; and
when the measured gear ratio differs from the first gear ratio by a predetermined threshold amount, control an engine speed of the engine based on the desired engine speed for a remainder of the gear shift from the first gear ratio to the second gear ratio.

12. The system of claim 11, wherein the controller is configured to calculate the desired engine speed as a function of the requested speed and the measured gear ratio.

13. The system of claim 11, wherein the controller is configured to calculate the desired engine speed as a function of the requested speed and the second gear ratio.

14. The system of claim 11, wherein the predetermined threshold amount is associated with a percent difference between the measured gear ratio and the first gear ratio, the controller being configured to command that the engine be operated at an engine speed corresponding to the desired engine speed once the percent difference between the measured gear ratio and the first gear ratio exceeds a value that is greater than zero and less than 5%.

15. The system of claim 14, wherein the controller is configured command that the engine be operated at an engine speed corresponding to the desired engine speed once the percent difference between the measured gear ratio and the first gear ratio exceeds a value that is greater than 1% and less than 3%.

16. The system of claim 11, wherein the controller is further configured to receive an input from the operator associated with maintaining the work vehicle at the requested speed.

* * * * *